United States Patent [19]
Fujita et al.

[11] Patent Number: 5,324,764
[45] Date of Patent: Jun. 28, 1994

[54] ERASABLE INK COMPOSITION FOR WRITING ON IMPERVIOUS SURFACE

[75] Inventors: Hisanori Fujita; Mikihiko Nakanishi, both of Osaka, Japan

[73] Assignee: Sakura Color Products Corporation, Osaka, Japan

[21] Appl. No.: 5,974

[22] Filed: Jan. 19, 1993

[30] Foreign Application Priority Data

Jan. 17, 1992 [JP] Japan .................. 4-006708

[51] Int. Cl.$^5$ .................................. C09D 11/16
[52] U.S. Cl. ........................ 524/377; 523/161; 524/376; 106/20 A; 106/19 A
[58] Field of Search .................. 106/19-32; 523/161; 524/505, 376-377

[56] References Cited

U.S. PATENT DOCUMENTS

| | | | |
|---|---|---|---|
| 3,834,823 | 9/1974 | Seregely et al. | 401/198 |
| 4,578,117 | 3/1986 | Nakanishi | 106/20 |
| 4,629,748 | 12/1986 | Miyajima et al. | 523/161 |
| 4,978,390 | 12/1990 | Snedeker | 106/19 |

FOREIGN PATENT DOCUMENTS

1249870  5/1989  Japan .................. C09D 11/18

*Primary Examiner*—Paul Lieberman
*Assistant Examiner*—Margaret Einsmann
*Attorney, Agent, or Firm*—Wenderoth, Lind & Ponack

[57] ABSTRACT

An erasable ink composition for writing on an impervious writing surface comprising an organic solvent, a resin, a pigment, and a separating agent which comprises:

(a) a polyoxyethylene polyoxypropylene block copolymer, as a first separating agent, which is liquid at normal temperatures in an amount of 5-20% by weight, and (b) at least one organic compound selected from the group consisting of a carboxylic acid ester, a polyoxypropylene monoalkyl ether and a polyoxyethylene polyoxypropylene monoalkyl ether, as a second separating agent, which is liquid at normal temperatures in an amount of 2-10% by weight.

9 Claims, No Drawings

ERASABLE INK COMPOSITION FOR WRITING ON IMPERVIOUS SURFACE

Field of the Invention

This invention relates to an erasable ink composition for writing on an impervious writing surface, and more particularly, to an erasable ink composition which contains a separating agent therein to provide writing on an impervious writing surface such as a so-called white board which is readily erasable by wiping lightly with an eraser made of, for example, felt.

Background of the Invention

A variety of erasable ink compositions to write on an impervious writing surface to provide writing thereon which is readily erasable by wiping with, for example, an eraser made of felt are already known, as disclosed in, for example, Japanese Patent Application Laid-open No. 63-43981, No. 62-265377 and No. 2-129278. However, these prior erasable ink compositions contain carboxylic acid esters, liquid paraffin, silicone resins or nonionic surfactants as a separating agent therein, and thus it is known that they provide writing which is insufficiently erasable depending upon the material of impervious writing surface. Namely, the prior erasable ink compositions have erasability dependent on the material of impervious writing surface. It is also known that such an ink composition provides writing which is not readily erasable after long standing. Namely, the prior erasable ink compositions have erasability dependent on time.

An ink composition containing polyoxyethylene polyoxypropylene block copolymer is disclosed in Japanese Patent Application Laid-open No. 60-206881. However, this ink composition is a so-called strippable paint made usable in writing instruments, and can not be used as an erasable writing ink composition.

Brief Summary of the Invention

It is an object of the invention to provide an ink composition which provides writing on an impervious writing surface readily erasable irrespective of the material of the surface and after long standing.

According to the invention, there is provided an erasable ink composition for writing on an impervious writing surface comprising an organic solvent, a resin, a pigment, and a separating agent, which comprises:

(a) a polyoxyethylene polyoxypropylene block copolymer which is liquid at normal temperatures in an amount of 5-20% by weight, and (b) at least one organic compound selected from the group consisting of a carboxylic acid ester, a polyoxypropylene monoalkyl ether and a polyoxyethylene polyoxypropylene monoalkyl ether which is liquid at normal temperature in an amount of 2-10% by weight.

DETAILED DESCRIPTION OF THE INVENTION

The ink composition of the invention contains an organic solvent preferably such as an alcohol or a glycol monoalkyl ether. The alcohol is preferably an aliphatic alcohol of 1-4 carbons such as methanol, ethanol, isopropyl alcohol, n-propyl alcohol or butanol. The glycol monoalkyl ether is preferably a monoalkyl ether of glycol of 2-4 carbons such as ethylene glycol monomethyl ether, ethylene glycol monoethyl ether, propylene glycol monomethyl ether or propylene glycol monoethyl ether. These solvents may be used singly or as a mixture.

The ink composition of the invention contains such an organic solvent in an amount of 40-90% by weight, preferably in an amount of 50-75% by weight. When the amount of organic solvent is too large, the resultant ink composition has no viscosity suitable for writing, and may not provide writing of a sufficient darkness. When the amount of organic solvent is too small, the resultant ink composition has a viscosity too large to write well, and it is also bad in storage stability.

The ink composition of the invention may further contain a dialkyl ketone wherein the alkyl has 1-4 carbons such as methyl ethyl ketone or methyl isobutyl ketone, or a lower aliphatic carboxylic acid ester wherein the carboxylic acid has 2-4 carbons and the alkyl has 1-3 carbons preferably such as ethyl acetate or butyl acetate, as a dissolving aid for a resin in an organic solvent used which will be described hereinafter.

The ink composition of the invention contains a pigment as a colorant. The amount of the pigment is determined in accordance with the pigment used and the darkness required. However, when the amount is too large, the resultant ink composition may have too large a viscosity and may be poor in writability and storability as well as erasability of writing, while when the amount is too small, the resultant ink composition may provide faint writing, and may also provide writing poor in erasability. Usually the ink composition of the invention contain a pigment in an amount of 1-30% by weight, preferably of 3-15% by weight.

A resin is contained in the ink composition so that the ink composition has a viscosity suitable for writing and has a suitable adhesion onto an impervious writing surface. It is necessary that the resin is soluble in the organic solvent used in the ink composition, and such a resin includes, for example, polyvinyl butyral resin, acrylic resin, styrene-acrylic copolymer resin, styrene-maleic acid copolymer resin, shellac resin and rosin-maleic acid copolymer resin.

When the resin is contained in excess, the resultant ink composition may have too large a viscosity and may deteriorate in writability, storability and erasability of writing, whereas when the amount is too small, the resultant ink composition may not have a viscosity suitable for writing, and may also provide writing of insufficient erasability. Usually the ink composition of the invention contains a resin in an amount of 1-20% by weight, preferably of 5-15% by weight.

The ink composition of the invention contains a separating agent which is liquid at normal temperatures. According to the invention, the separating agent is composed of two components. The first component is a polyoxyethylene polyoxypropylene block copolymer which is liquid at normal temperatures, and preferably has an oxyethylene content of not more than 40% by weight, and a molecular weight of 700-3000.

Such a polyoxyethylene polyoxypropylene block copolymer is commercially available such as Newpol PE-61, PE-62 or PE-71 (Sanyo Kasei Kogyo K.K., Japan), Pluronic L-31, L-42, L-61, L-72, L-81 or L-101 (Asahi Denka Kogyo K.K., Japan), Bpan 420 or 720 (Dai-ichi Kogyo Seiyaku K.K., Japan), Emulgen PP-150 or PP-230 (Kao K.K., Japan), Pronon 102 or 201 (Nippon Yushi K.K., Japan), Actinol P-3035 (Matsumoto Yushi Seiyaku K.K., Japan), Lionol PL-32, PL-42 or PL-712 (Lion K.K., Japan).

The polyoxyethylene polyoxypropylene block copolymer is contained in an amount of 5–20% by weight based on the ink composition. When the amount is too small, the resultant ink composition may not have a sufficient erasability, whereas when the amount is too large, the resultant ink composition may have a viscosity too large for writing well, or write faintly. It is preferred that the ink composition contains the copolymer in an amount of 7–15% by weight.

The second component of the separating agent used in the invention is at least one organic compound selected from the group consisting of a carboxylic acid ester, a polyoxypropylene monoalkyl ether and a polyoxyethylene polyoxypropylene monoalkyl ether which is liquid at normal temperatures. The carboxylic acid ester may be a carboxylic acid alkyl ester, a dibasic acid diester or a mono- or polyester of a polyhydric alcohol.

The carboxylic acid alkyl ester is preferably such a carboxylic acid alkyl ester wherein the carboxylic acid is a saturated or an unsaturated and has 8–20 carbons, and the alkyl has 2–20 carbons. Such a carboxylic acid alkyl ester may be exemplified by cetyl octanoate, isocetyl octanoate, stearly octanoate, hexyl laurate, isostearyl laurate, butyl myristate, isopropyl palmitate, isostearyl palmitate, isopropyl isostearate, butyl isostearate, hexyl isostearate, isocetyl isostearate, ethyl oleate or decyl oleate.

The dibasic acid diester used includes an aliphatic dibasic carboxylic acid diester or an aromatic dibasic carboxylic acid diester, preferably a dialkyl ester wherein the alkyl has 2–20 carbons. Thus, the dibasic acid diester used includes, for instance, di-2-ethylhexyl succinate, diisopropyl adipate, dioctyl adipate, diisopropyl sebacate, dibutyl phthalate, dioctyl phthalate and diisodecyl phthalate.

The ester of polyhydric alcohol is preferably a mono- or a polyester derived from an aliphatic polyhydric alcohol of 4–8 carbons including glycols and a saturated or an unsaturated fatty acid of 6–24 carbons. Accordingly, the ester of polydric alcohol used includes, for instance, an ester of trimethylol propane such as trimethylol propane (mono, di or tri)oleate, trimethylol propane (mono, di or tri)caproate, tri-2-ethylhexyl trimethylates (such as trialkyl esters of trimethylol compound, exemplified by trimethylol propane), trimethylol propane triisopalmitate, trimethylol propane trioctanoate or trimethylol propane triisostearate; an ester of pentaerythritol such as pentaerythritol tetraoctanoate or pentaerythritol tetra-2-ethyl hexanoate; an ester of propylene glycol such as propylene glycol monocaprilate, propylene glycol dicaprilate or propylene glycol didecanoate; or a fatty acid (mono, di or tri)glyceride or a mixture of these (esters of glycerine and fatty acids) such as olive oil, safflower oil or coconut oil.

The polyoxyethylene polyoxypropylene monoalkyl ether used in the invention is commercially available, and may be exemplified by Nikkol PBC-31 or PBC-41 (Nikko Chemicals K. K., Japan), Newpol 50HB-55, 50HB-100, 50HB-260, 50HB-400, 50HB-600 or 50HB-1000 (Sanyo Kasei Kogyo K. K., Japan), Dovanox DL-0206, DM-2007 or DH-0300 (Lion K. K., Japan), Lionol L-358, L-745, L-785 or L-950 (Lion K. K., Japan).

The polyoxypropylene monoalkyl ether is also commercially available, and may be exemplified by Newpol LB-65, LB-285, LB-385, LB-625, LB-1145, LB-1715 or LB-3000 (Sanyo Kasei Kogyo K. K., Japan).

The second separating agent is contained in the ink composition in an amount of 2–10% by weight, preferably of 3–8% by weight, based on the ink composition. When the amount of the second separating agent is too small, the resultant ink composition may not have a sufficient erasability, whereas when the amount is too large, the resultant ink composition may have a viscosity too large for writing well, or writes faintly.

According to the invention, it is in particular preferred that the first and second separating agents are contained in conjunction in an amount of 10–23% by weight.

As hereinbefore set forth, the use of polyoxyethylene polyoxypropylene block copolymer only as a separating agent does not provide an ink composition of a high erasability. However, according to the invention, the use of the above mentioned second separating agent in conjunction with the polyoxyethylene polyoxypropylene block copolymer as a composite separating agent provides an ink composition of a high erasability. Thus, the ink composition of the invention writes well on any impervious writing surface, and the writing is readily erased with an eraser of, for example, felt, irrespectively of the material of the impervious writing surface. In addition, the writing can be readily erased after long standing.

The ink composition of the invention may be produced by a conventional method, and is not limited to any specific method. By way of example, when a normal pigment is used as a colorant, the pigment is mixed with a resin in an organic solvent, the resultant mixture is milled in a bead mill to disperse the pigment finely in the solvent to form a mill base, there are added a separating agent and other components if necessary to the mill base, and then the resultant mixture is stirred. When a resin-coated pigment is used as a colorant, all the components may be mixed together at the same time, and the pigment may be dispersed in the solvent used with a paint shaker. In either methods, the resultant ink composition may be filtered or centrifuged to remove therefrom coarse materials.

Examples of the ink composition of the invention will now be described, however, the invention is not limited thereto. In the examples, parts are parts by weight.

EXAMPLE 1

| Newpol PE-61 | 8 parts |
| Isocetyl isostearate | 8 parts |
| Fuji AS Green[1] | 10 parts |
| Fuji AS White[2] | 3 parts |
| Ethyl alcohol | 61 parts |
| Isopropyl alcohol | 10 parts |
| Example 2 | |
| Newpol PE-62 | 5 parts |
| Isopropyl isostearate | 12 parts |
| Fuji AS Blue[3] | 10 parts |
| Fuji AS White[2] | 3 parts |
| Ethyl alcohol | 60 parts |
| Isopropyl alcohol | 10 parts |
| Example 3 | |
| Newpol PE-71 | 12 parts |
| Cetyl octanoate | 4 parts |
| Fuji AS Red[4] | 10 parts |
| Fuji AS White[2] | 4 parts |
| Ethyl alcohol | 51 parts |
| Isopropyl alcohol | 10 parts |
| Reference Example 1 | |
| Newpol PE-61 | 4 parts |
| Fuji AS Green[1] | 10 parts |
| Fuji AS White[2] | 3 parts |

| -continued | |
|---|---|
| Ethyl alcohol | 73 parts |
| Isopropyl alcohol | 10 parts |
| Example 4 | |
| Pluronic L-31 | 10 parts |
| Stearyl octanoate | 4 parts |
| Fuji AS Orange[5] | 13 parts |
| Fuji AS White[2] | 2 parts |
| Ethyl alcohol | 60 parts |
| Isopropyl alcohol | 10 parts |
| Example 5 | |
| Pluronic L-42 | 7 parts |
| Butyl myristate | 3 parts |
| Fuji AS White[2] | 20 parts |
| Ethyl alcohol | 60 parts |
| Isopropyl alcohol | 10 parts |
| Example 6 | |
| Pluronic L-61 | 10 parts |
| Butyl isostearate | 6 parts |
| Fuji AS Black[6] | 15 parts |
| Ethyl alcohol | 59 parts |
| Isopropyl alcohol | 10 parts |
| Reference Example 2 | |
| Stearyl octanoate | 15 parts |
| Fuji AS Orange[5] | 13 parts |
| Fuji AS White[2] | 2 parts |
| Ethyl alcohol | 60 parts |
| Isopropyl alcohol | 10 parts |
| Example 7 | |
| Pronon 102 | 7 parts |
| Dioctyl adipate | 8 parts |
| Fuji AS Orange[5] | 13 parts |
| Fuji AS White[2] | 2 parts |
| Ethyl alcohol | 60 parts |
| Isopropyl alcohol | 10 parts |
| Example 8 | |
| Lionol PL-42 | 15 parts |
| Diisooctyl sebacate | 2 parts |
| Fuji AS Green[1] | 10 parts |
| Fuji AS White[2] | 3 parts |
| Ethyl alcohol | 51 parts |
| Isopropyl alcohol | 10 parts |
| Example 9 | |
| Epan 420 | 5 parts |
| Dibutyl phthalate | 6 parts |
| Fuji AS Blue[3] | 10 parts |
| Fuji AS White[2] | 3 parts |
| Ethyl alcohol | 66 parts |
| Isopropyl alcohol | 10 parts |
| Example 10 | |
| Emulgen PP-150 | 8 parts |
| Dioctyl phthalate | 4 parts |
| Fuji AS Red[4] | 10 parts |
| Fuji AS White[2] | 4 parts |
| Ethyl alcohol | 64 parts |
| Isopropyl alcohol | 10 parts |
| Example 11 | |
| Pluronic L-101 | 7 parts |
| Diisooctyl phthalate | 3 parts |
| Fuji AS White[2] | 20 parts |
| Ethyl alcohol | 60 parts |
| Isopropyl alcohol | 10 parts |
| Reference Example 3 | |
| Dioctyl adipate | 15 parts |
| Fuji AS Orange[5] | 13 parts |
| Fuji AS White[2] | 2 parts |
| Ethyl alcohol | 60 parts |
| Isopropyl alcohol | 10 parts |
| Example 12 | |
| Pluronic L-42 | 8 parts |
| Trimethylol propane oleate | 6 parts |
| Fuji AS Black[6] | 15 parts |
| Ethyl alcohol | 61 parts |
| Isopropyl alcohol | 10 parts |
| Example 13 | |
| Newpol PE-71 | 10 parts |
| Trimethylol propane trioctanoate | 5 parts |
| Fuji AS Orange[5] | 13 parts |
| Fuji AS White[2] | 2 parts |
| Ethyl alcohol | 60 parts |

| -continued | |
|---|---|
| Isopropyl alcohol | 10 parts |
| Example 14 | |
| Pluronic L-42 | 8 parts |
| Pentaerythritol tetra-2-ethylhexanoate | 6 parts |
| Fluorescent orange base | 41 parts |
| White base | 5 parts |
| Ethyl alcohol | 35 parts |
| Isopropyl alcohol | 5 parts |
| The above fluorescent orange base has the composition below: | |
| Epocolor FP-40[7] | 36 parts |
| Denka Butyral[9] | 9 parts |
| Isopropyl alcohol | 10 parts |
| Ethyl alcohol | 45 parts |

Such a pigment base as above may be usually prepared by adding a pigment to a solution of a resin such as polyvinyl butyral resin in an organic solvent, and mixing the resultant mixture in a bead mill.

The above white base has the composition below:

| Titanium KR-380[8] | 60 parts |
|---|---|
| Denka Butyral[9] | 6 parts |
| Isopropyl alcohol | 7 parts |
| Ethyl alcohol | 27 parts |
| Example 15 | |
| Epan 720 | 12 parts |
| Olive oil[12] | 6 parts |
| Blue base | 40 parts |
| White base | 5 parts |
| Ethyl alcohol | 35 parts |
| Isopropyl alcohol | 5 parts |
| The above blue base has the composition below: | |
| Phthlocyanine blue (dye) | 13 parts |
| Esreck BL-1[10] | 13 parts |
| Solmix AP-1[11] | 74 parts |
| Reference Example 4 | |
| Pentaerythritol tetra-2-ethylhexanoate | 14 parts |
| Fluorescent orange base | 41 parts |
| White base | 5 parts |
| Ethyl alcohol | 35 parts |
| Isopropyl alcohol | 5 parts |
| Example 16 | |
| Pronon 102 | 7 parts |
| Nikkol PBC-31 | 8 parts |
| Fuji AS Orange[5] | 13 parts |
| Fuji AS White[2] | 2 parts |
| Ethyl alcohol | 60 parts |
| Isopropyl alcohol | 10 parts |
| Example 17 | |
| Lionol PL-42 | 10 parts |
| Newpol 50HB-26 | 7 parts |
| Fuji AS Green[1] | 10 parts |
| Fuji AS White[2] | 3 parts |
| Ethyl alcohol | 51 parts |
| Isopropyl alcohol | 10 parts |
| Example 18 | |
| Epan 420 | 5 parts |
| Dovanox DL-020 | 6 parts |
| Fuji AS Blue[3] | 10 parts |
| Fuji AS White[2] | 3 parts |
| Ethyl alcohol | 66 parts |
| Isopropyl alcohol | 10 parts |
| Example 19 | |
| Emulgen PP-150 | 8 parts |
| Lionol L-745 | 4 parts |
| Fuji AS Red[4] | 10 parts |
| Fuji AS White[2] | 4 parts |
| Ethyl alcohol | 64 parts |
| Isopropyl alcohol | 10 parts |
| Example 20 | |
| Pluronic L-42 | 8 parts |
| Newpol 50HB-660 | 7 parts |
| Fuji AS White[2] | 20 parts |
| Ethyl alcohol | 55 parts |
| Isopropyl alcohol | 10 parts |
| Reference Example 5 | |

-continued

| | |
|---|---|
| Nikkol PBC-31 | 15 parts |
| Fuji AS Orange[5] | 13 parts |
| Fuji AS White[2] | 2 parts |
| Ethyl alcohol | 53 parts |
| Isopropyl alcohol | 10 parts |
| Example 21 | |
| Actinol P-3035 | 8 parts |
| Newpol LB-65 | 6 parts |
| Fuji AS White[2] | 20 parts |
| Ethyl alcohol | 56 parts |
| Isopropyl alcohol | 10 parts |
| Example 22 | |
| Lionol PL-712 | 10 parts |
| Newpol LB-285 | 5 parts |
| Fuji AS Orange[5] | 13 parts |
| Fuji AS White[2] | 2 parts |
| Ethyl alcohol | 60 parts |
| Isopropyl alcohol | 10 parts |
| Example 23 | |
| Pluronic L-61 | 8 parts |
| Newpol LB-385 | 6 parts |
| Fluorescent orange base | 41 parts |
| White base | 5 parts |
| Ethyl alcohol | 35 parts |
| Isopropyl alcohol | 5 parts |
| Example 24 | |
| Newpol PE-61 | 8 parts |
| Newpol LB-625 | 8 parts |
| Fuji AS Green[1] | 10 parts |
| Fuji AS White[2] | 3 parts |
| Ethyl alcohol | 61 parts |
| Isopropyl alcohol | 10 parts |
| Reference Example 6 | |
| Newpol LB-285 | 15 parts |
| Fuji AS Orange[5] | 13 parts |
| Fuji AS White[2] | 2 parts |
| Ethyl alcohol | 60 parts |
| Isopropyl alcohol | 10 parts |

Notes:
[1]-[6]Polyvinyl butyral resin-coated pigment dispersible in alcohols, available from Fuji Shikiso K.K., Japan
[7]Fluorescent orange pigment available from Nihon Shokubai Kogyo K.K., Japan
[8]Titanium dioxide available from Titan Kogyo K.K., Japan
[9]Polyvinyl butyral resin available from Denki Kagaku Kogyo K.K., Japan
[10]Polyvinyl butyral resin available from Sekisui Kagaku Kogyo K.K., Japan
[11]Modified ethanol available from Nippon Kasei K.K., Japan
[12]Available from Nikko Chemicals K.K., Japan Writing was formed on various impervious writing surfaces as shown in Table 1, and its initial erasability and standing erasability were examined. The initial erasability is defined as the erasability of writing when being wiped with an eraser made of felt immediately after the writing was formed, and the standing erasability is defined as the erasability of writing when being wiped with an eraser made of felt after standing at a temperature of 40° C. and a relative humidity of 40% for seven days. Among the writing boards, there were used two melamine resin boards.

The erasability was evaluated as follows. When the writing was erased by wiping five times with a sheet of felt (5 cm×5 cm) under a load of 200 g or 400 g, the erasability was marked "A"; when the writing was erased by wiping eight times under a load of 800 g, the erasability was marked "B"; and when the writing was not erased by wiping ten times under a load of 800 g, the erasability was marked "C". The mark "-" indicates that evaluation is not possible since the color of the writing board was the same as that of the writing formed thereon.

As indicated in Table 1, the ink composition of the invention provides writing on an impervious surface which is readily erasable after long standing. The ink composition has also erasability substantially independent on the material of impervious surface, and provides erasable writing on any impervious surface.

More specifically, the ink composition of the invention contains the first and the second separating agent in conjunction. The first separating agent improves, in particular, the dependence of erasability and standing erasability of writing. These improvement may be derived from the following properties of the agent. The agent has a good wettability to any impervious surface, however it does not spread on the surface, i.e., it remains where writing is formed. In addition, the agent is water-soluble, however, it contains substantially a constant amount of water, and it does not readily evaporate from the writing formed. In contrast, the prior separating agents such as known esters, silicone or liquid paraffin spreads and evaporate on an impervious surface, and change in water content on the surface, so that the writing formed with an ink composition containing such a separating agent may have a poor erasability as time passes. It is also likely that such an ink composition has varied wettability depending on the material of impervious surface, and thus the erasability is undesirably dependent on the material of impervious surface on which writing is formed.

In turn, the second separating agent improves, in particular, the fluidity and wettability of the first separating agent, thereby to improve erasability as a whole. The second separating agent also improves the coloration of writing on a black color impervious writing board.

TABLE 1

| | | Melamine, Black Board A | | Melamine, Black Board B | | Acrylic, Transparent Board | | Melamine, White Board | | Enameled, White Board | | Polyester, White Board | |
|---|---|---|---|---|---|---|---|---|---|---|---|---|---|
| | | Initial | Standing | Initial | Standing | Initial | Standing | Initial | Standing | Initial | Standing | Initial | Standing |
| Example | 1 | A | B | A | B | A | A | A | A | A | A | A | B |
| | 2 | A | B | B | B | A | B | A | B | A | A | B | B |
| | 3 | A | B | A | B | A | B | A | A | A | A | A | B |
| | 4 | A | A | A | A | A | A | A | A | A | A | A | A |
| | 5 | A | B | A | B | A | A | — | — | — | — | — | — |
| Reference | 1 | B | C | A | C | A | B | A | B | A | B | A | C |
| Example 1 | 2 | A | C | B | C | A | C | A | C | A | A | B | C |
| Example | 6 | — | — | — | — | A | A | A | A | A | A | A | B |
| | 7 | A | A | A | A | A | A | A | B | A | A | B | B |
| | 8 | B | B | A | A | A | A | A | A | A | A | B | B |
| | 9 | A | B | A | A | A | A | A | B | A | A | B | B |
| | 10 | A | B | A | A | A | A | A | A | A | A | B | B |
| | 11 | B | B | A | B | A | A | — | — | — | — | — | — |
| Reference Example 1 | 3 | B | C | A | C | A | C | B | C | A | B | B | C |

TABLE 2

| | | Melamine, Black Board A | | Melamine, Black Board B | | Acrylic, Transparent Board | | Melamine, White Board | | Enameled, White Board | | Polyester, White Board | |
|---|---|---|---|---|---|---|---|---|---|---|---|---|---|
| | | Initial | Standing | Initial | Standing | Initial | Standing | Initial | Standing | Initial | Standing | Initial | Standing |
| Example | 12 | — | — | — | — | A | B | A | B | A | A | B | B |
| | 13 | A | B | A | A | A | A | A | A | A | A | B | B |
| | 14 | A | B | A | B | A | B | A | B | A | A | B | B |
| | 15 | A | A | A | A | A | A | A | A | A | A | A | B |
| Reference Example 1 | 4 | A | C | B | C | A | C | A | C | A | A | B | C |
| Example | 16 | A | A | A | B | A | A | A | A | A | A | A | B |
| | 17 | A | A | A | B | A | A | A | A | A | A | A | B |
| | 18 | A | B | A | B | A | A | A | A | A | A | A | B |
| | 19 | A | B | A | B | A | A | A | A | A | A | A | B |
| | 20 | A | A | A | B | A | A | — | — | — | — | — | — |
| Reference Example 1 | 5 | A | C | A | B | A | A | A | A | A | A | A | B |
| Example | 21 | A | A | A | B | A | B | — | — | — | — | — | — |
| | 22 | A | A | A | A | A | B | A | B | A | A | B | B |
| | 23 | A | A | A | B | A | B | A | B | A | A | B | B |
| | 24 | A | A | A | B | A | B | A | B | A | A | A | B |
| Reference Example 1 | 6 | A | C | B | C | A | C | A | C | A | A | B | C |

What is claimed is:

1. A liquid, erasable ink composition for writing on an impervious writing surface comprising:
   (a) at least one organic solvent selected from the group consisting of an aliphatic alcohol of 1 to 4 carbons and a glycol monoalkyl ether wherein the glycol has 2 to 4 carbons:
   (b) at least one resin selected from the group consisting of polyvinyl butyral resin, acrylic resin, styrene-acrylic copolymer resin, styrene-maleic acid copolymer resin, shellac resin and rosin-maleic acid copolymer resin;
   (c) a pigment; and
   (d) a separating agent which comprises:
   (i) a polyoxyethylene polyoxypropylene block copolymer, as a first separating agent, which is liquid at ambient temperatures in an amount of 5-20% by weight, and
   (ii) at least one organic compound selected from the group consisting of a carboxylic acid ester, a polyoxypropylene monoalkyl ether and a polyoxyethylene polyoxypropylene monoalkyl ether, as a second separating agent, which is liquid at ambient temperatures in an amount of 2-10% by weight.

2. The ink composition as claimed in claim 1 wherein the carboxylic acid ester is an alkyl ester of a saturated or an unsaturated carboxylic acid wherein the carboxylic acid has 8-20 carbons and the alkyl has 2-20 carbons.

3. The ink composition as claimed in claim 1 wherein the carboxylic acid ester is an aliphatic dibasic carboxylic acid dialkyl ester or an aromatic dibasic carboxylic acid dialkyl ester wherein the alkyl has 2-20 carbons.

4. The ink composition as claimed in claim 3 wherein the aliphatic dibasic carboxylic acid dialkyl ester is a succinate, an adipate or a sebacate.

5. The ink composition as claimed in claim 3 wherein the aromatic dibasic carboxylic acid dialkyl ester is a phthalate.

6. The ink composition as claimed in claim 1 wherein the carboxylic acid ester is an ester of an aliphatic polyhydric alcohol of 4-8 carbons and a saturated or an unsaturated fatty acid of 6-24 carbons.

7. The ink composition as claimed in claim 6 wherein the polyhydric alcohol is glycerine, trimethylol propane, pentaerythritol or propylene glycol.

8. The ink composition as claimed in claim 1 which contains the first and the second separating agents in conjunction in an amount of 10-23% by weight.

9. The ink composition as claimed in claim 1 wherein the organic solvent is ethyl alcohol or isopropyl alcohol, or a mixture of these.

* * * * *